US012680504B2

(12) United States Patent
Enriquez

(10) Patent No.: US 12,680,504 B2
(45) Date of Patent: Jul. 14, 2026

(54) IGNITOR CANISTER FOR A TURBINE GLOW PLUG

(71) Applicant: Enrique J. Enriquez, Miami, FL (US)

(72) Inventor: Enrique J. Enriquez, Miami, FL (US)

( * ) Notice: Subject to any disclaimer, the term of this patent is extended or adjusted under 35 U.S.C. 154(b) by 0 days.

(21) Appl. No.: 18/984,682

(22) Filed: Dec. 17, 2024

(65) Prior Publication Data

US 2026/0168443 A1 Jun. 18, 2026

(51) Int. Cl.
*F02C 7/264* (2006.01)
*F23Q 7/22* (2006.01)

(52) U.S. Cl.
CPC ............... *F02C 7/264* (2013.01); *F23Q 7/22* (2013.01); *F23R 2900/00009* (2013.01)

(58) Field of Classification Search
CPC .. F02C 7/26; F02C 7/264; F02C 7/266; F23Q 7/00; F23Q 7/001; F23Q 7/06; F23Q 7/22; F02P 19/00; F02P 19/02; F02P 19/021; F02P 19/022; F02P 19/023; F02P 19/025; F02P 19/026; F02P 19/027; F02P 19/028; F02P 19/04; H05B 2203/027; F02N 19/06; F02N 19/08; F02B 23/0657; F02M 57/00; F02M 57/06; H01T 13/00; H01T 13/02; H01T 13/06; F23R 2900/00009
See application file for complete search history.

(56) References Cited

U.S. PATENT DOCUMENTS 3,630,184 A * 12/1971 Wolf ........................ F02N 19/06
                                                            123/549
3,689,195 A * 9/1972 Beesch ................... F02N 19/06
                                                            123/179.21

3,718,425 A * 2/1973 Weyl et al. ............. F02N 19/08
                                                            123/145 A
4,215,979 A 8/1980 Morishita
4,733,053 A * 3/1988 Mueller .................. F23Q 7/001
                                                            361/266
5,216,990 A * 6/1993 Moosmann ............. F23Q 7/001
                                                            123/179.21
5,377,440 A * 1/1995 Eller ....................... F02N 19/06
                                                            431/11
5,664,547 A * 9/1997 Klak ....................... F02N 19/06
                                                            123/549
5,880,433 A * 3/1999 Eller ....................... F23Q 7/001
                                                            219/544
6,177,653 B1 * 1/2001 Chiu ....................... F23Q 7/001
                                                            123/145 A
6,512,204 B1 * 1/2003 Chiu ................... F02B 23/0657
                                                            123/145 A (Continued)

FOREIGN PATENT DOCUMENTS

DE       102016203464 A1 * 9/2016 ............. F23Q 7/001

*Primary Examiner* — William H Rodriguez

(74) *Attorney, Agent, or Firm* — Michael A. DiNardo; YK LAW LLP

(57) ABSTRACT

An ignitor canister for accommodating a glow plug in a turbine includes an elongated housing having a cavity configured to receive a tip and shaft of the glow plug therein. A base of the housing has an open end to receive the tip and shaft of the glow plug therethrough and engage a base of the glow plug. The housing has a window formed at a first end that exposes a tip of the glow plug. A fuel passageway of the housing injects fuel to the tip of the glow plug. The ignitor canister may include air flow pathways to keep the glow plug cool during operation.

17 Claims, 10 Drawing Sheets

(56) References Cited

U.S. PATENT DOCUMENTS

| | | | | |
|---|---|---|---|---|
| 7,470,875 | B1 * | 12/2008 | Wilcox | F23Q 7/001 |
| | | | | 313/120 |
| 9,567,912 | B2 * | 2/2017 | Prociw | F02C 7/266 |
| 10,168,242 | B2 * | 1/2019 | Brechbühl | G01L 23/10 |
| 12,497,922 | B1 * | 12/2025 | Ryon | F02C 7/224 |
| 2007/0022736 | A1 | 2/2007 | Durling et al. | |
| 2008/0149613 | A1 * | 6/2008 | Ishinada | F23Q 7/001 |
| | | | | 219/270 |
| 2013/0306017 | A1 * | 11/2013 | Doi | H01T 13/08 |
| | | | | 123/145 A |
| 2014/0326207 | A1 * | 11/2014 | Eguchi | F23Q 7/00 |
| | | | | 29/520 |
| 2014/0373799 | A1 * | 12/2014 | Suzuki | G01M 15/08 |
| | | | | 123/145 A |
| 2016/0123293 | A1 * | 5/2016 | Cho | F02P 19/02 |
| | | | | 219/121.64 |
| 2017/0067793 | A1 * | 3/2017 | Brechbühl | G01L 23/22 |
| 2020/0080486 | A1 * | 3/2020 | Freer | F23Q 7/08 |
| 2020/0080529 | A1 * | 3/2020 | Freer | F02C 7/266 |
| 2022/0154682 | A1 * | 5/2022 | Freer | F02C 7/266 |

* cited by examiner

IGNITOR CANISTER FOR A TURBINE GLOW PLUG

FIELD OF THE INVENTION

The present invention is generally directed to ignitors and fuel injectors for turbines. More particularly, the present invention is directed to an ignitor canister for accommodating a glow plug in a turbine.

BACKGROUND OF THE INVENTION

A turbine is a rotary mechanical device that extracts energy from a fluid flow, such as water, stream, air or combustion gases, and converts it into useful work. Turbines are generally used in electrical generation, engines and propulsion systems.

The combustor section is a core part of the turbine where a mixture of compressed air and fuel gets ignited by an ignition device, therefore creating a combustion reaction. A turbine ignitor should be able to reliably ignite a combustible mixture during numerous starts that occur throughout the operational cycle of the turbine engine.

The use of heavy fuels, such as diesel, to power the turbine engine requires the ignition temperature to be much higher than other mixtures, which in turn calls for the use of complex devices to meet the demands of ignition in an already extreme environment. Glow plugs are commonly used in diesel engines. However, a conventional diesel glow plug cannot withstand the harsh combustor environment of a turbine.

Accordingly, there is a continuing need for a device or method of accommodating a conventional glow plug for use as an ignitor in a turbine, which may use diesel or other heavy fuels to power it. The present invention fulfills these needs and provides other related advantages.

SUMMARY OF THE INVENTION

The present invention is generally directed to a device that accommodates a conventional glow plug, such as a diesel glow plug, in a manner that protects it from the harsh combustor environment, while allowing for easy installation, maintenance and replacement in a turbine setting, such as a turbine running on diesel or other heavy fuels.

In accordance with the present invention, an ignitor canister for a turbine glow plug comprises an elongated housing having a cavity configured to receive a tip and shaft of the glow plug therein. The housing has a window formed at a first end thereof that exposes the tip of the glow plug. A base of the housing at a second end thereof has an open end configured to receive the tip and the shaft of the glow plug therethrough and engage a base of the glow plug. A fuel passageway associated with the housing is for injecting fuel to the tip of the glow plug.

The cavity of the housing may be sized and configured to provide an air flow path between at least a portion of the shaft and tip of the glow plug. Typically, an inner surface of the cavity is spaced apart from substantially an entire outer surface of the tip and the shaft of the glow plug to cool the glow plug.

An inner surface of the base of the housing may be threaded to attach to a threaded base of the glow plug.

The window may be formed in a side wall of the housing near the first end thereof. A cowl may be associated with the window. For example, the cowl may curve from the first end of the housing so as to extend over and/or define a portion of the window.

The fuel passageway may be formed in the housing and include a fuel inlet port attachable to a fuel line.

An air vent may be formed in an outer wall of the housing. The air vent may comprise at least one air inlet. The at least one air inlet may be formed in an area of the housing disposed within a lower temperature, high pressure portion of a combustion chamber of the turbine. The at least one air inlet may comprise a plurality of spaced apart air inlet apertures. At least one air outlet is in fluid communication with the at least one air inlet. Preferably, the at least one air outlet is formed in an area of the housing disposed within a higher temperature portion of the combustion chamber of the turbine.

The ignitor canister may include a position indicator formed on the housing. The position indicator may comprise a notch or marking formed on the base of the housing. The position indicator indicates an orientation of the housing window within the turbine when the ignitor canister is installed so as to indicate a proper or desired orientation of the housing window, such as with respect to an additional fuel inlet of the turbine.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a fuel ignitor canister, generally referred to by the reference number 100, for use with an ignitor, typically a conventional glow plug, providing a protective shield for the glow plug to extend its life cycle. The fuel ignitor canister 100 is configured and designed to accommodate a conventional glow plug, such as a diesel glow plug, therein in a manner that protects the glow plug from the harsh combustor environment, while allowing for easy installation, maintenance and replacement of the glow plug.

Figure 1:
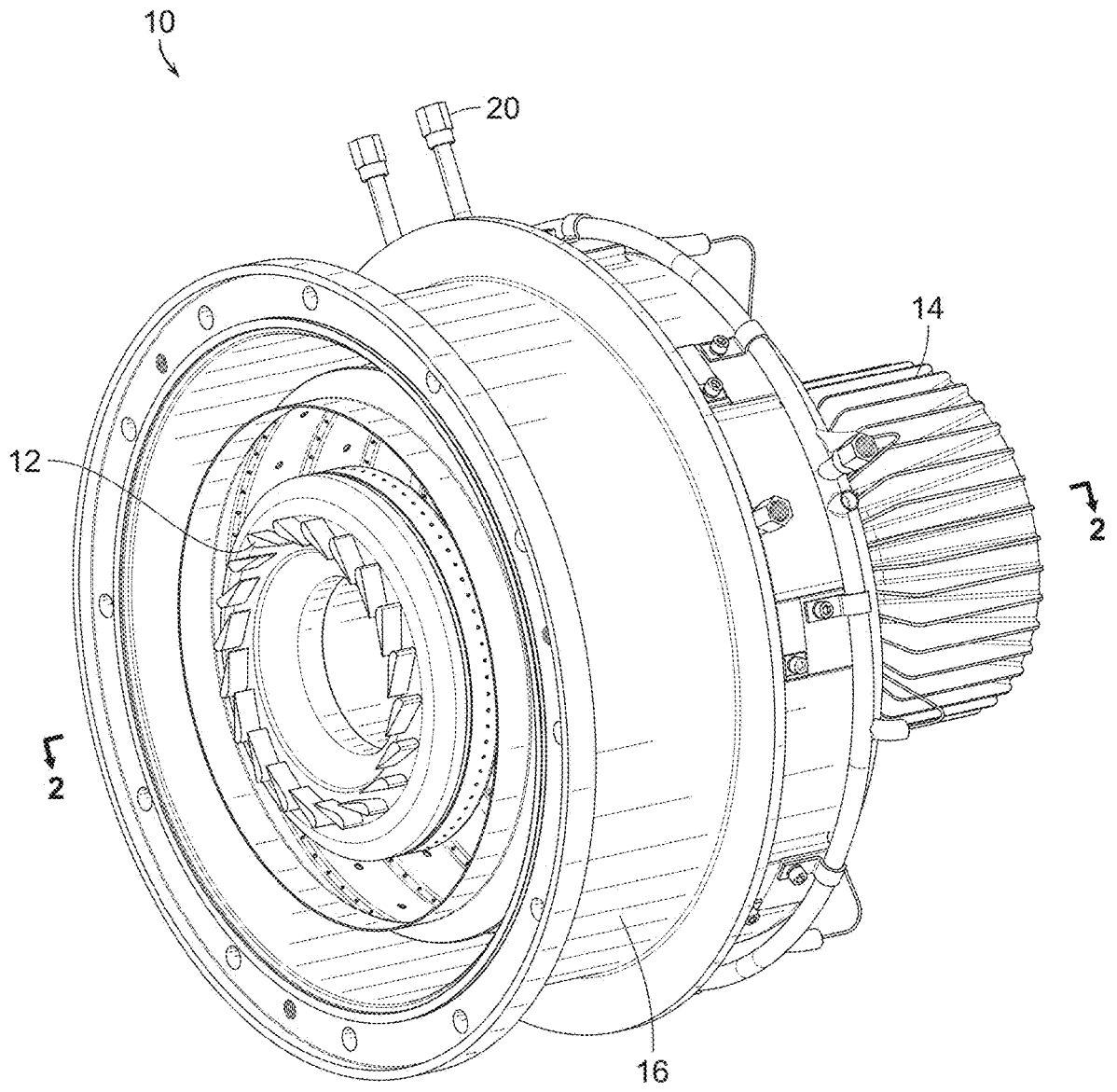
FIG. 1 is a side perspective view of an exemplary turbine incorporating the ignitor canister of the present invention.
Figure 2:
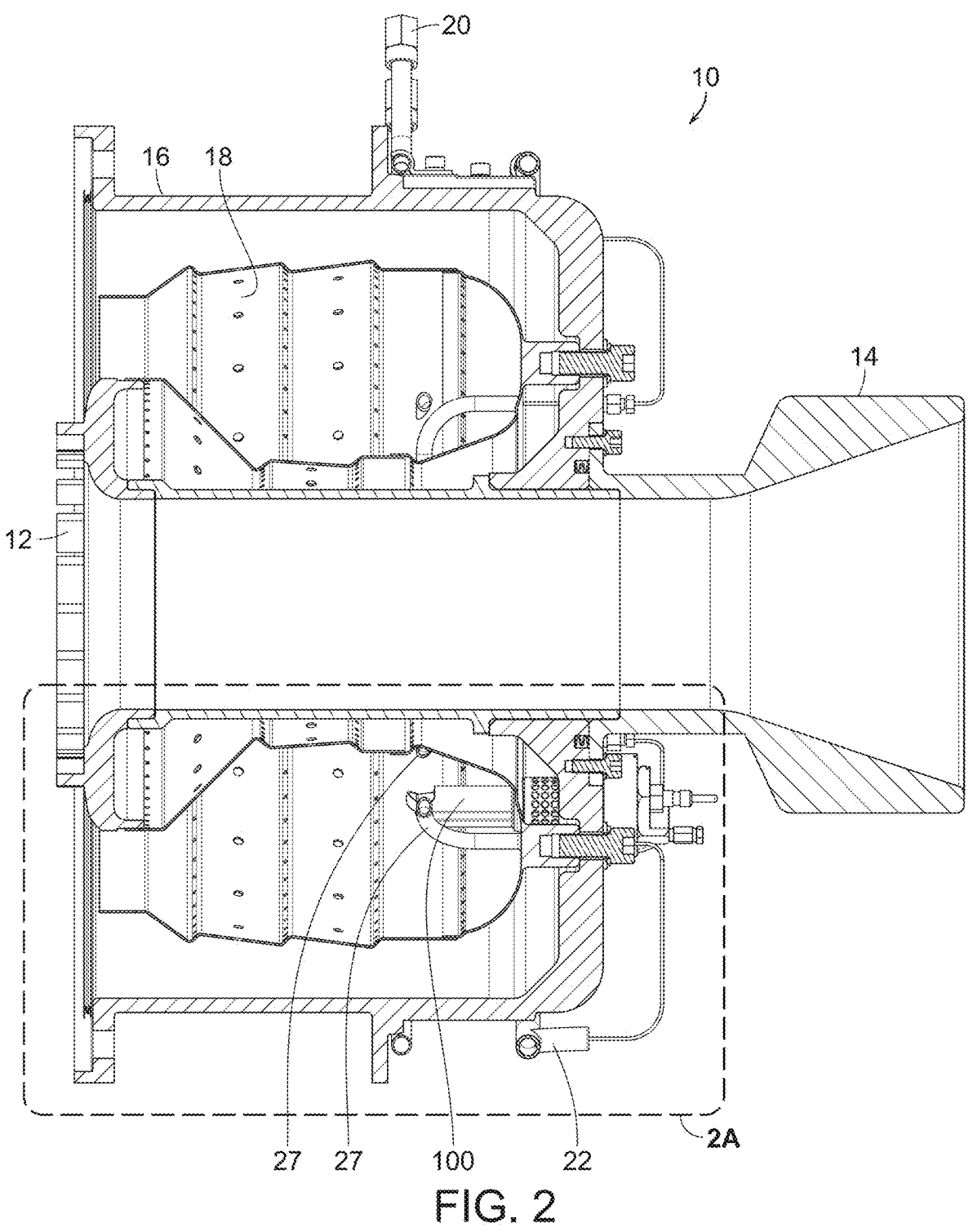
FIG. 2 is a cross-sectional view taken generally along lines 2-2, illustrating the ignitor canister of the present invention operably coupled to the turbine.

With reference now to FIGS. 1 and 2, the fuel ignitor canister 100 of the present invention is typically used in connection with a turbine combustor. The turbine may comprise what is referred to as a micro turbine. Such turbines may operate on heavy fuel, such as diesel fuel, for which a glow plug may be used to ignite the fuel mixture. However, the turbine combustor environment is harsh, which can adversely affect the operating life or even viability of use of the glow plug.

Figure 2A:
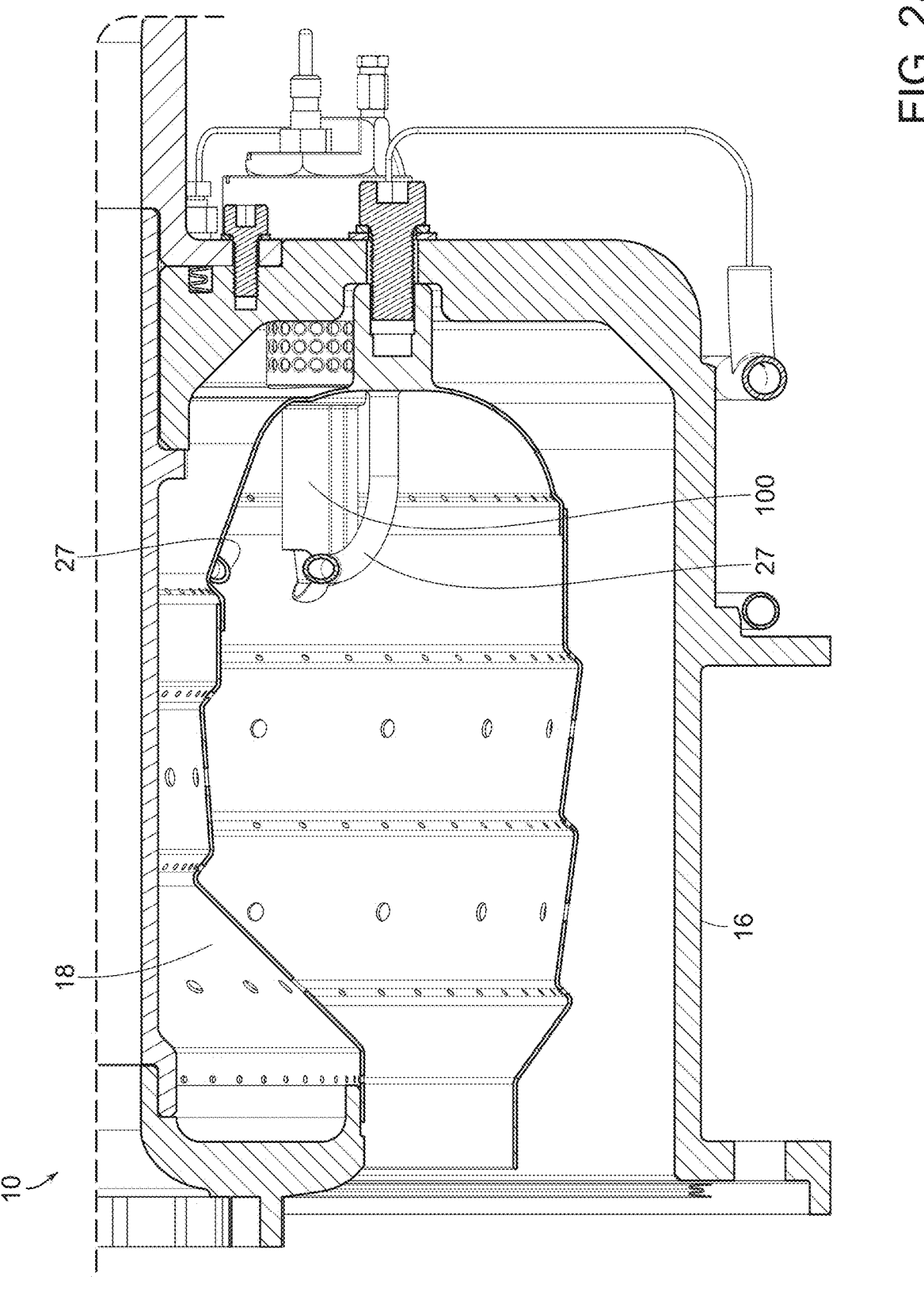
FIG. 2A is an enlarged view of area "2A" of FIG. 2.

FIGS. 1-2A illustrate an exemplary turbine 10. The illustrated turbine 10 includes a ring turbine vane 12 at an air inlet thereof and an exhaust cone 14 at an outlet thereof. A combustor case 16 houses a combustor liner assembly 18 defining a combustion chamber. One or more fuel distribution lines 20 provide fuel to a fuel manifold 22 and the fuel ignitor canister 100, which extends into the combustion chamber defined by the combustor liner assembly 18. It will be appreciated that the illustrated turbine 10 is exemplary, and other turbines of varying configurations, sizes, purposes, etc. could incorporate the fuel ignitor canister 100 of the present invention.

With reference now to FIGS. 3-6, it can be seen that the canister 100 is elongated and of a generally cylindrical shape. The canister 100 is designed and configured so as to receive a glow plug therein and act as a protective shield for the glow plug so as to extend the life cycle of the glow plug. The canister 100 is also configured and designed so as to maintain the glow plug at a lowest temperature possible. Preferably, the canister 100 is made of a high temperature, high pressure resistant metal alloy.

The canister is comprised of an elongated housing 102 having a first end portion 104, and intermediate portion 106, and a base 108 at a second end thereof. The base 108 has an open end 110 which is in communication with a cavity 112 that is sized and configured so as to receive at least a portion of the glow plug 30 therein. More particularly, the cavity 112 receives a tip 32 and a shaft 34 of the glow plug 30 therein. The base 108, and more particularly the opening 110 of the base 108, is configured to receive the tip and shaft 32 and 34 of the glow plug 30 therethrough and engage a base 36 of the glow plug 30. Typically, as illustrated, internal threads 114 are formed in the base 108 which attach to external threads 38 of the glow plug 30, so as to securely hold the glow plug 30 within the canister 100. If the glow plug 30 needs to be replaced, it is merely detached, by rotating and unthreading its connection to the canister 100, wherein a new glow plug 30 can be inserted and attached to the canister 100 using the reverse steps.

The portion of the housing 102 defining the inner cavity 112 serves as a shroud or cover which surrounds a substantial length of the glow plug 30 so as to protect it from the harsh environment within the combustor. An opening in the housing defines a window 116 through which the tip 32 of the glow plug 30 is exposed. The window 116 adjacent to the tip 32 of the glow plug 30 is formed laterally through a side wall of the housing 102, and particularly towards the first end of the upper portion 104 of the housing 102.

Figures 6, 6A:
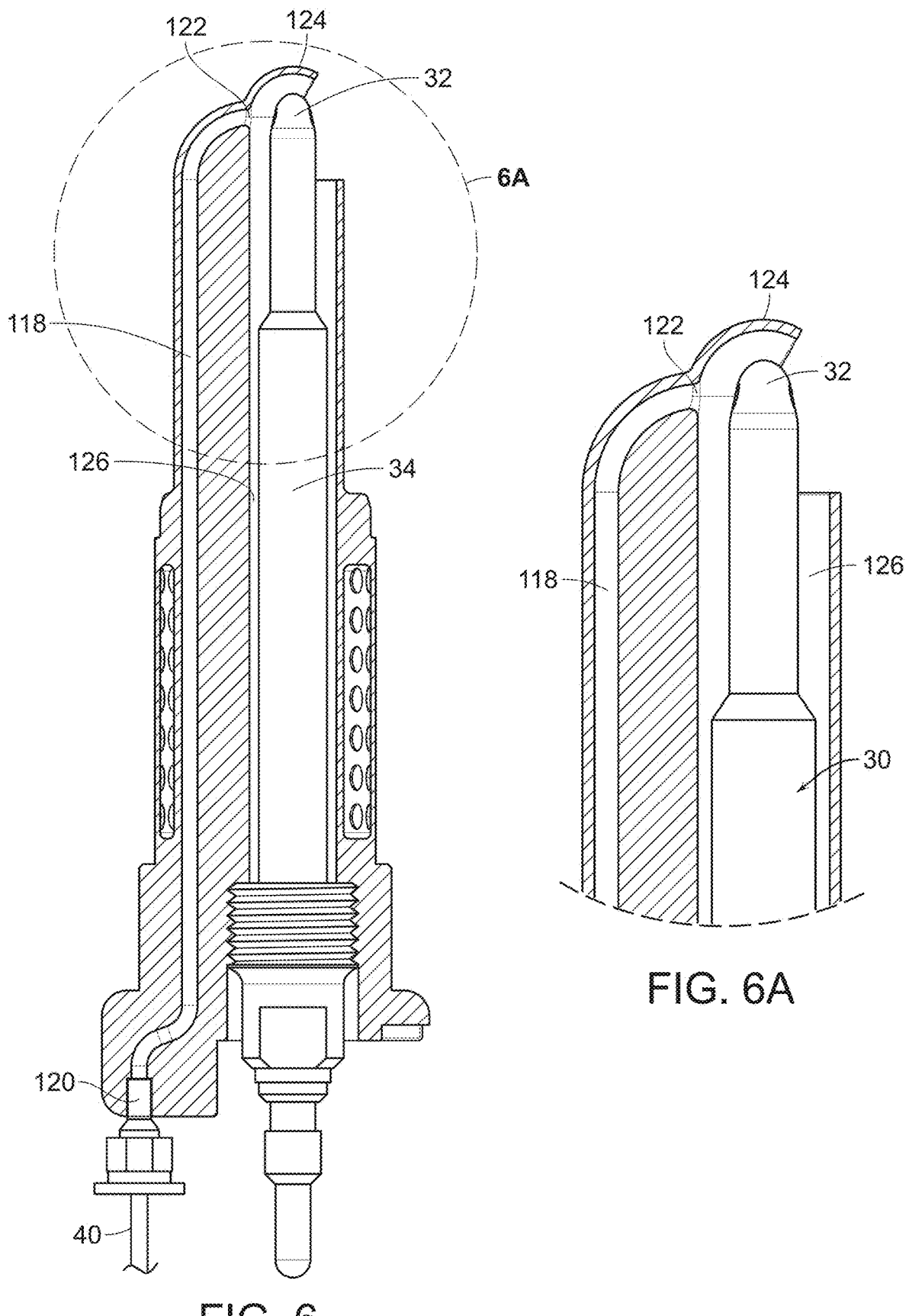
FIG. 6 is a cross-sectional view illustrating the ignitor canister of the present invention housing a glow plug therein and attached to a fuel line, in accordance with the present invention.
FIG. 6A is an enlarged view of area "6A" of FIG. 6.

A fuel passageway 118 is associated with the housing 102 for injecting fuel to the tip 32 of the glow plug 30. Typically, the fuel passageway 118 is formed in the housing 102, as illustrated, and includes a fuel inlet port 120 at one end thereof, which is attachable to a fuel line 40, and a fuel injector end 122 at a generally opposite end thereof. The fuel passageway 118, as illustrated, forms a narrow cavity that runs along the entire length of the housing 102, generally parallel with the glow plug receiving cavity 112. As can be seen, such as in FIGS. 5 and 6, the fuel injection end 122 of the fuel passageway is directed and positioned so as to squirt the fuel to the tip 32 of the glow plug 30 at a desired angle and pressure. As can be seen, the fuel injector end 122 of the fuel passageway 118 is curved towards the end thereof such that the fuel injection end or opening 122 is disposed in alignment with the tip 32 of the glow plug 30, as illustrated in FIG. 6. Thus, the fuel which is injected or otherwise squirted directly impacts the tip 32 of the glow plug 30 when in operation.

A cowl 124 is associated with the window 116. The cowl 124 curves from a first end tip of the housing 102 so as to extend over and define a portion of the window 116. The cowl 124 and window 116, which form an opening lateral to one side of the tip of the housing 102 protect the injector tip or end 122 of the fuel passageway 118 from disturbances within the combustor chamber. The curved cowl 124 also protects the fuel flow from the injector end 122 of the fuel passageway 118 to the tip 32 of the glow plug 30 when air disturbances within the combustor chamber.

Figure 7:
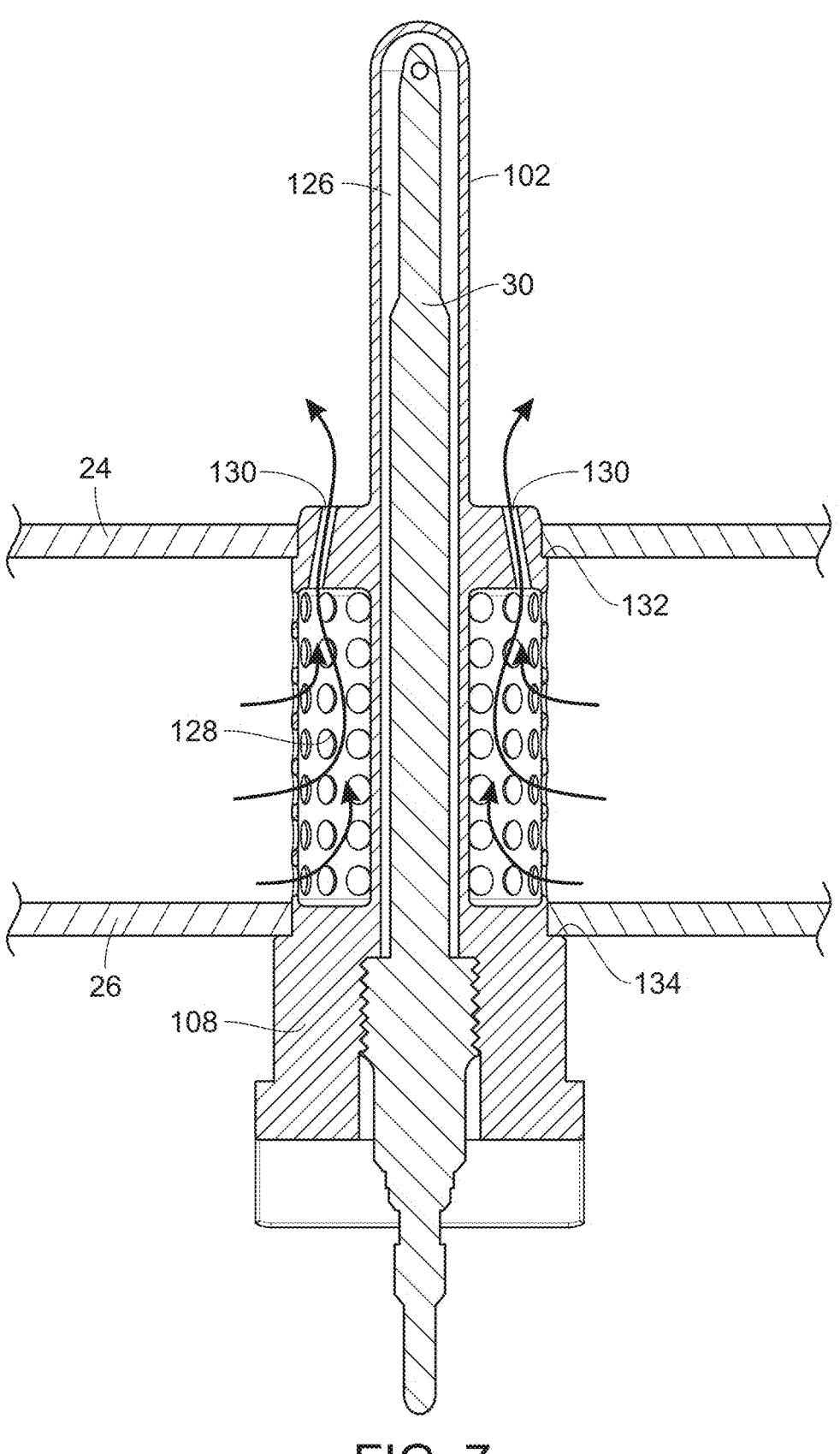
FIG. 7 is a front sectional view of the ignitor canister of the present invention having a glow plug therein, and illustrating air flow through an air vent thereof.
Figure 8:
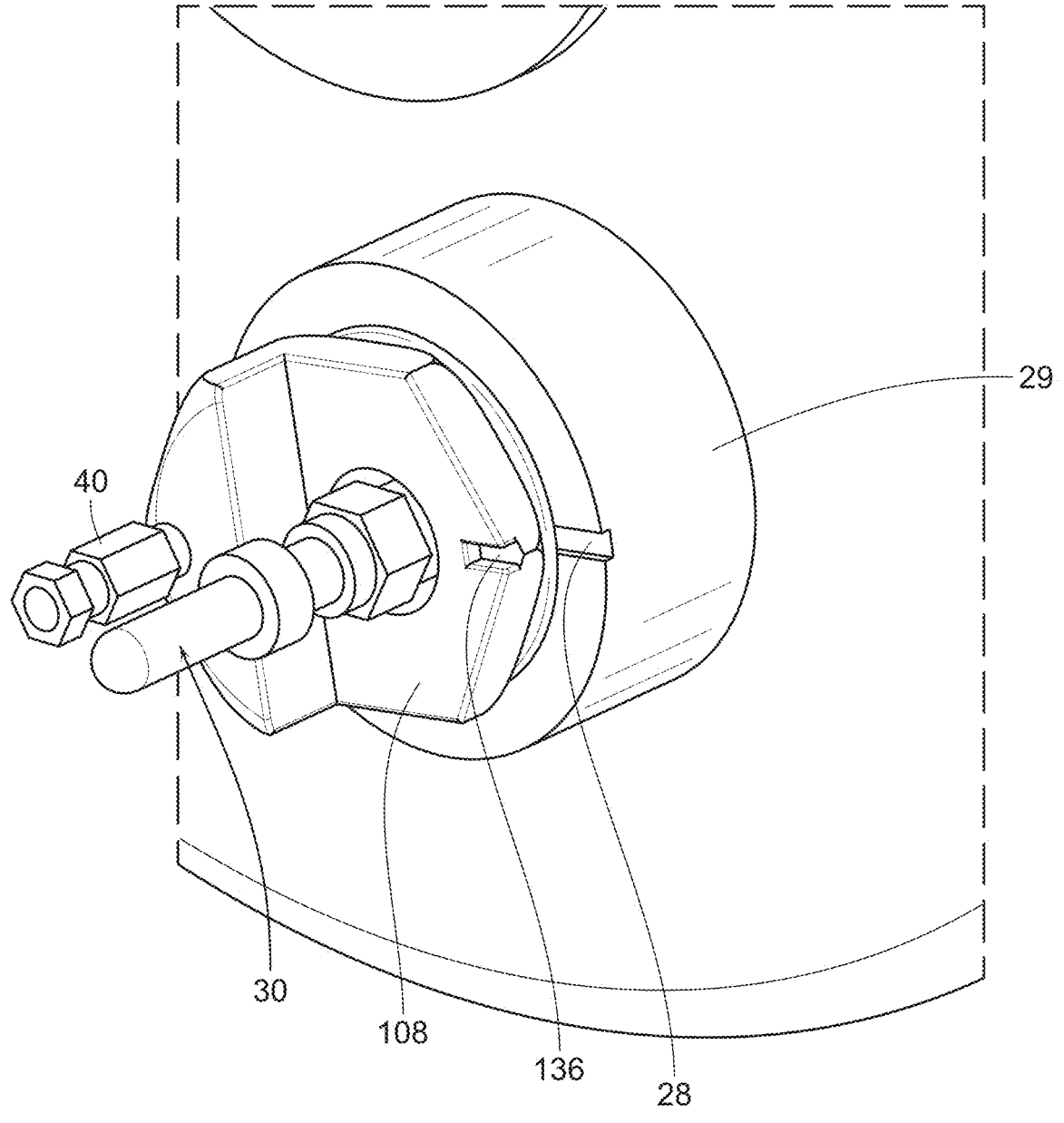
FIG. 8 is a side perspective view, illustrating an ignitor canister embodying the present invention installed to a turbine, with the position indicator of the canister aligned with a notch or marking on the turbine, in accordance with the present invention.

With reference now to FIGS. 6-7, the cavity 112 is sized and configured to provide an air flow path 126 between at least a portion of the tip 32 and shaft 34 of the glow plug 30. More particularly, an inner surface of the cavity is spaced apart from substantially an entire outer surface of the tip 32 and shaft 34 of the glow plug to air cool the glow plug 30.

The fuel ignitor canister 100 may include an air vent formed in an outer wall of the housing 102. The air vent comprises at least one air inlet 128, and more typically a plurality of spaced apart inlet apertures, as illustrated, formed in the intermediate portion 106 of the housing. The air vent also comprises at least one air outlet 130 which is in fluid communication with the at least one air inlet. As illustrated, such as in FIG. 3, the air vent outlet may comprise a plurality of air outlet apertures. The air outlet apertures 130 are typically formed in a shoulder 132 between the upper portion 104 and intermediate portion 106 of the housing 102.

Figure 3:
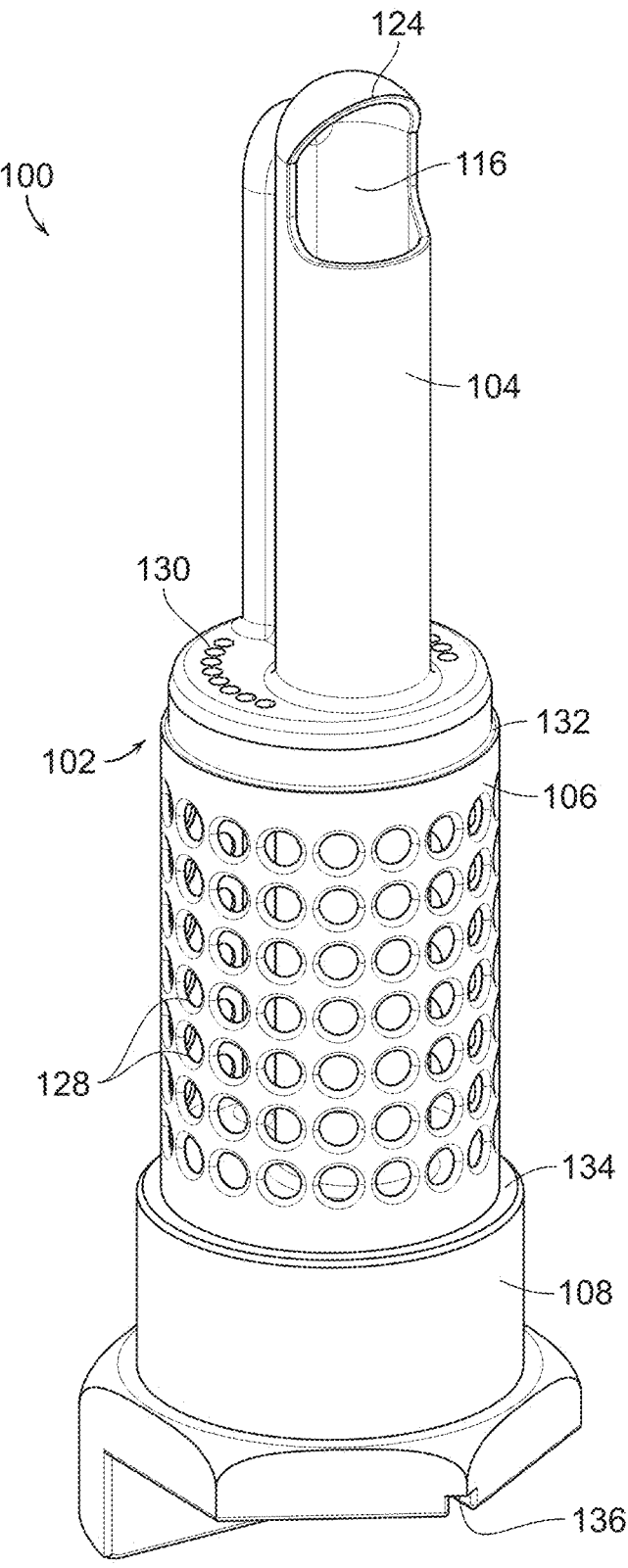
FIG. 3 is a front perspective view of an ignitor canister embodying the present invention.
Figure 4:
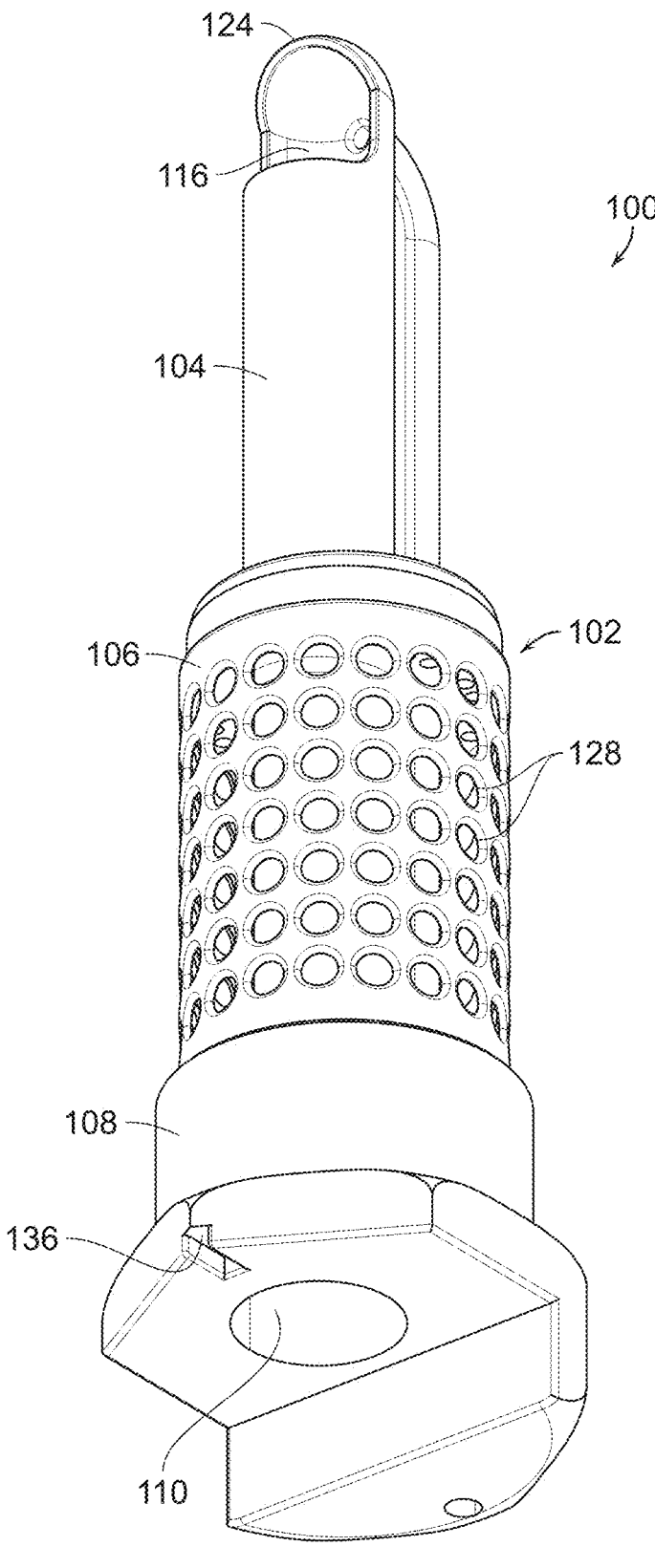
FIG. 4 is a bottom perspective view of the ignitor canister of FIG. 3.
Figure 5:
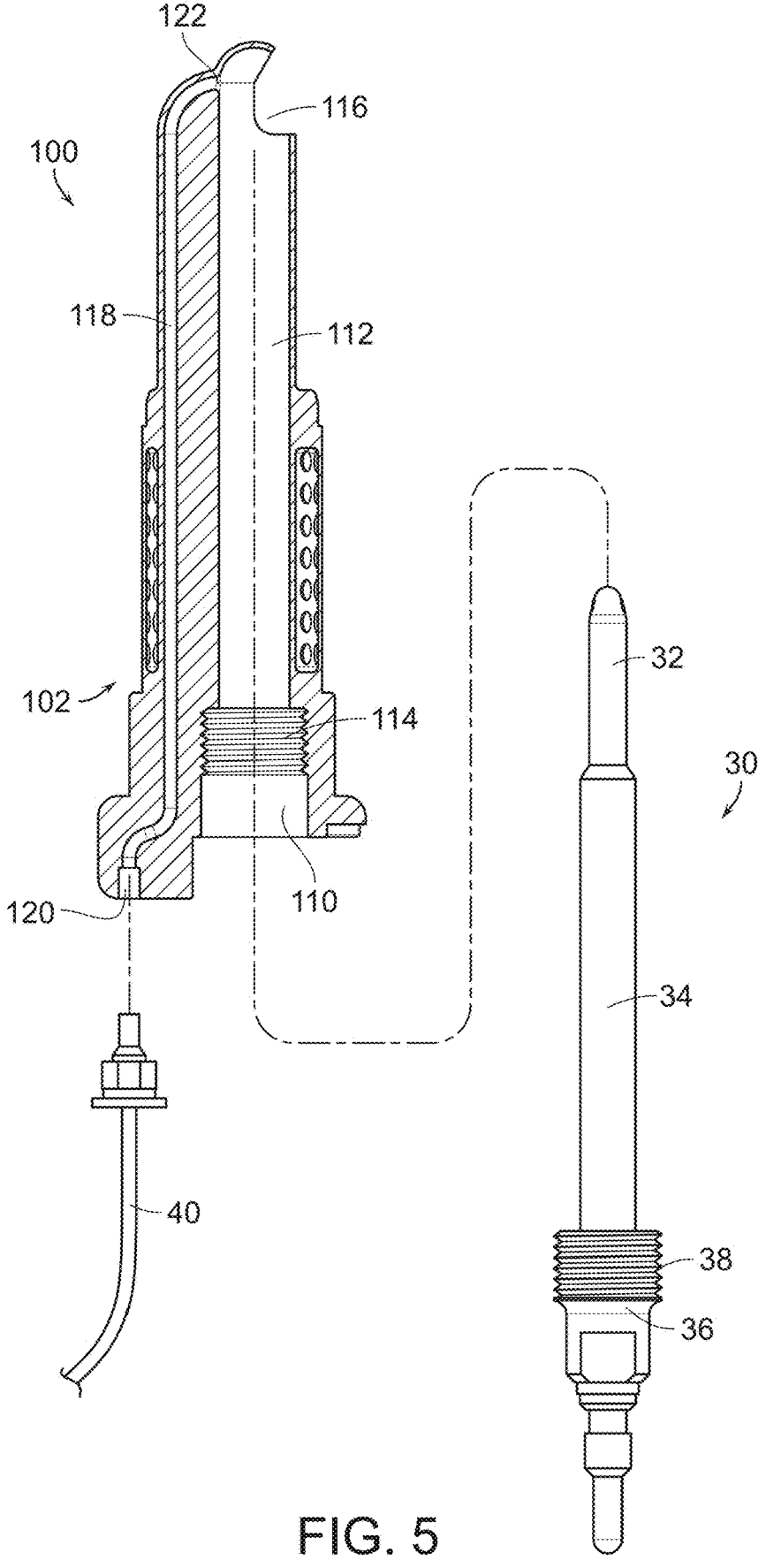
FIG. 5 is a diagrammatic view of a sectioned ignitor canister of the present invention and a glow plug and fuel line attachable thereto.

With reference to FIGS. 3 and 7, there is a step or shoulder 134 intermediate the air inlet apertures 128 and the air outlet apertures 130. This step or shoulder 134 engages an inner combustor wall 24 of the turbine 10. This places the upper portion of the housing 104, as well as air vent outlet 130 within a low pressure, high temperature portion of the combustor chamber. A second step or shoulder 136 is formed intermediate the base 108 and the air inlet apertures 128 of the air vent. This step or shoulder 136 comes into contact with and engages another wall 26 of the turbine 10. The space intermediate walls 24 and 26 define a high pressure, low temperature combustor chamber area. The high pressure/low pressure differential between the combustor chambers ensures a one-way air flow, as illustrated by the air flow lines in FIG. 7. The air flow from the low temperature combustor chamber helps to regulate the temperature of the glow plug 30 and the lowest possible temperature. This creates a cooling effect beneficial to the glow plug 30. This air vent arrangement, in conjunction with the air pathway 126 formed within the cavity of the housing 102 cooperatively maintain the glow plug 30 at the lowest temperature possible by flowing air around the glow plug 30, and flowing air from the colder side to the hotter side of the combustor. The higher pressure of the lower temperature side of the combustor ensures a constant one-way air flow from the air inlets 128 to the air outlets 130 of the air vent. This greatly protects the glow plug 30 from extreme temperature, therefore extending its life cycle.

Figure 9:
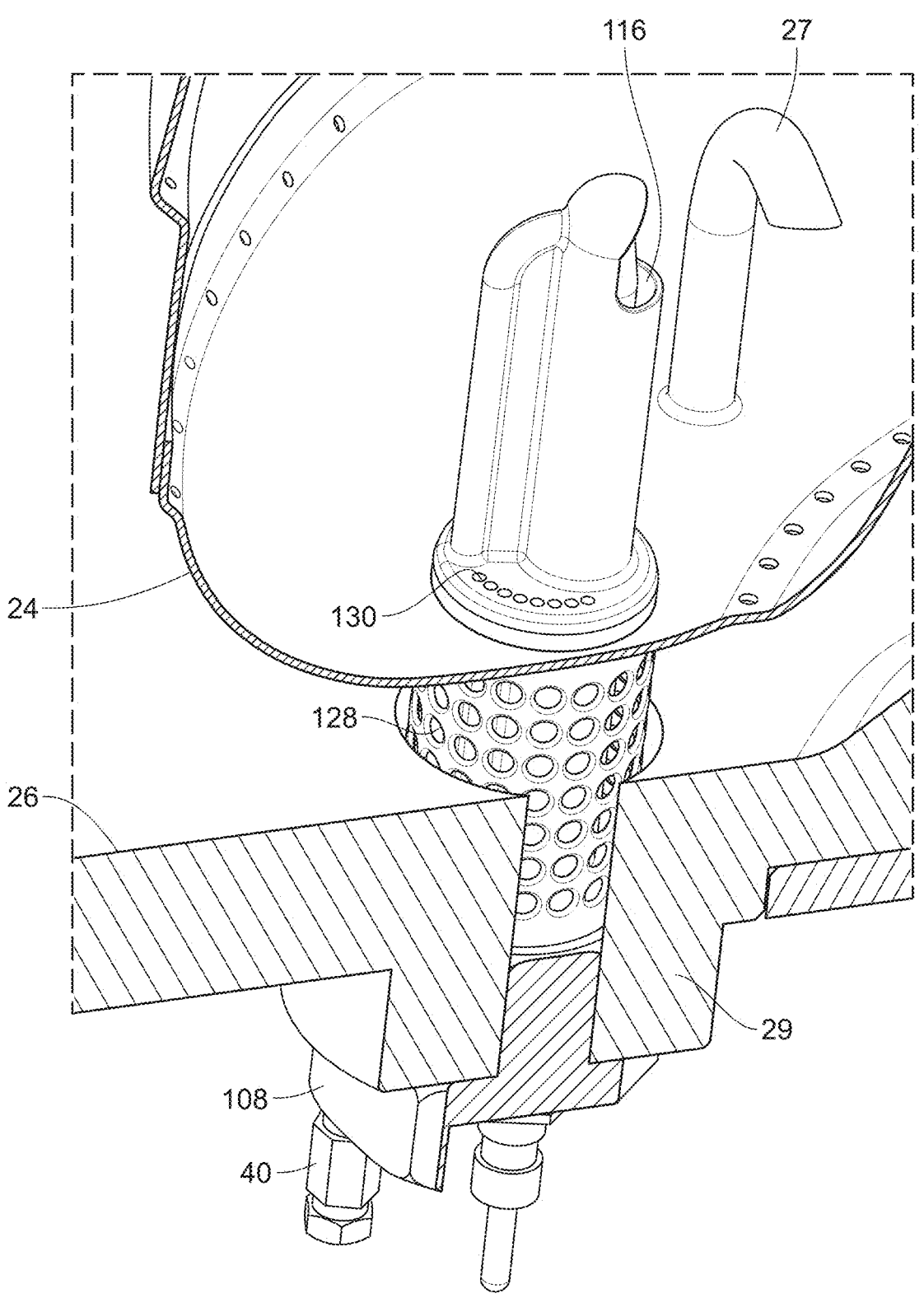
FIG. 9 is a partially sectioned and perspective view illustrating an ignitor canister of the present invention, containing a glow plug therein, in proper alignment with a fuel inlet of the turbine, in accordance with the present invention.

As shown in various figures, including FIGS. 2, 2A and 9, the turbine 10 may include additional fuel inlets for disbursing fuel into the combustor chamber. These may comprise J-shaped tubes 27 having openings which emit fuel or a fuel mixture into the combustor chamber for ignition. In such cases, it is desirable that the housing window 116, and more particularly the tip 32 of the glow plug 30 be oriented so as to face an outlet of the fuel intake tube 27. However, as the ignitor canister 100 is installed, such as by rotational threaded attachment to a boss or other portion of the housing 29 of the turbine 10, the portion of the canister 100, including the window 116 is not visible to the installer. Thus, a notch or other marking 28 is formed on the boss or other portion of the housing 29 of the turbine 10, such that when a position indicator 136 of the canister 100, which is typically formed on the base 108 thereof which extends external of the boss or housing 29 of the turbine 10 comes into an alignment with the notch or marking 28 of the boss or housing 29, the installer knows that the canister has been properly positioned and oriented, such that the window 116 of the housing 104 and the tip 32 of the glow plug 30 is facing an outlet of the fuel emitting tube 27. The position indicator 136 of the canister 100 may comprise a notch, as illustrated, or other marking, formed on a portion of the base 108 of the housing of the canister 100 which will remain external to the boss or housing of the turbine 10. In this manner, the tip 32 of the glow plug 30 can ignite both the air fuel mixture exiting from the injector end 122 of the fuel passageway 118, and also the fuel which is emitted from the end of at least one of the J-tubes 27 within the combustor chamber of the turbine 10. In this manner, a maximum ignition of the fuel is achieved.

Although several embodiments have been described in detail for purposes of illustration, various modifications may be made without departing from the scope and spirit of the invention. Accordingly, the invention is not to be limited, except as by the appended claims.

What is claimed is:

1. An ignitor canister for a turbine glow plug, the ignitor canister comprising:
an elongated housing having a cavity configured to receive a tip and shaft of the glow plug therein;
the housing having a window formed at a first end thereof that exposes a tip of the glow plug;
a base of the housing at a second end thereof having an open end configured to receive the tip and shaft of the glow plug therethrough and engage a base of the glow plug;
a fuel passageway associated with the housing which injects fuel to the tip of the glow plug, and
and an air vent formed in an outer wall of the housing, where the air vent comprises at least one air inlet formed in an area of the housing disposed within a lower temperature, high pressure portion of a c combustion chamber of a turbine and at least one air outlet in fluid communication with the at least one air inlet and formed in an area of the housing disposed within a higher temperature portion of the combustion chamber of the turbine.

2. The ignitor canister of claim 1, wherein the cavity is sized and configured to provide an air flow path between at least a portion of the shaft and tip of the glow plug.

3. The ignitor canister of claim 2, wherein an inner surface of the cavity is spaced apart from substantially an entire outer surface of the tip and the shaft of the glow plug to air cool the glow plug.

4. The ignitor canister of claim 1, wherein the fuel passageway is formed in the housing and includes a fuel inlet port attachable to a fuel line.

5. The ignitor canister of claim 1, wherein an inner surface of the base of the housing is threaded to attach to a threaded base of the glow plug.

6. The ignitor canister of claim 1, wherein the window is formed in a sidewall of the housing near the first end thereof.

7. The ignitor canister of claim 6, including a cowl associated with the window.

8. The ignitor canister of claim 7, wherein the cowl curves from the first end of the housing so as to extend over the tip of the glow plug and define a portion the window.

9. The ignitor canister of claim 1, wherein the air vent comprises a plurality of spaced apart air inlet apertures.

10. The ignitor canister of claim 1, including a position indicator formed on the housing to indicate an orientation of the housing window within the turbine when the ignitor canister is installed.

11. The ignitor canister of claim 10, wherein the position indicator comprises a notch or marking formed on the base of the housing.

12. An ignitor canister for a turbine glow plug, the ignitor canister comprising:
an elongated housing having a cavity configured to receive a tip and shaft of the glow plug therein, wherein the cavity is sized and configured to provide an air flow path between at least a portion of the shaft and tip of the glow plug to air cool the glow plug;
a curved cowl formed at a first end of the housing and partially defining a window formed in the housing that exposes a tip of the glow plug;
a base of the housing at a second end thereof having an open end configured to receive the tip and shaft of the glow plug therethrough and engage a base of the glow plug;
a fuel passageway formed in the housing which injects fuel to the tip of glow plug; and
an air vent formed in an outer wall of the housing, wherein the air vent comprises at least one air inlet formed in an area of the housing disposed within a lower temperature, high portion of a combustion chamber of a turbine and at least one air outlet in fluid communication with the at least one air inlet and formed in an area of the housing disposed within a higher temperature portion of the combustion chamber of the turbine.

13. The ignitor canister of claim 12, wherein an inner surface of the cavity is spaced apart from substantially an entire outer surface of the tip and the shaft of the glow plug to form the air flow path.

14. The ignitor canister of claim 12, wherein the fuel passageway includes a fuel inlet port attachable to a fuel line.

15. The ignitor canister of claim 14, wherein the air vent comprises a plurality of spaced apart air inlet apertures.

16. The ignitor canister of claim 12, wherein an inner surface of the base of the housing is threaded to attach to a threaded base of the glow plug.

17. The ignitor canister of claim 12, including a position indicator comprising a marking or notch formed on the base of the housing for indicating an orientation of the housing window within the turbine when the ignitor canister is installed.

\* \* \* \* \*